Nov. 7, 1961 W. H. SILVER ET AL 3,007,531
PLOW REVERSIBLE BY VANE TYPE HYDRAULIC MOTOR
Filed July 17, 1958 2 Sheets-Sheet 2
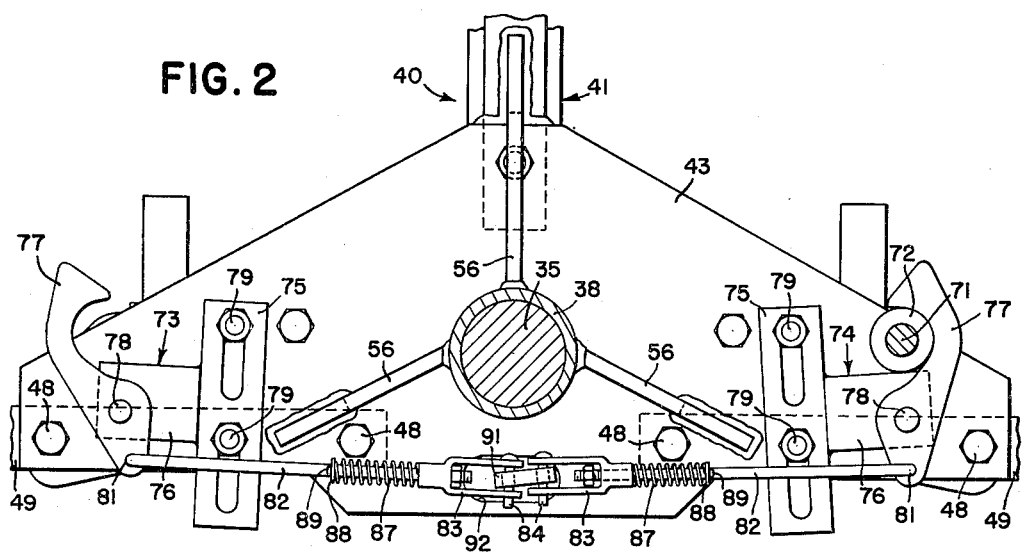
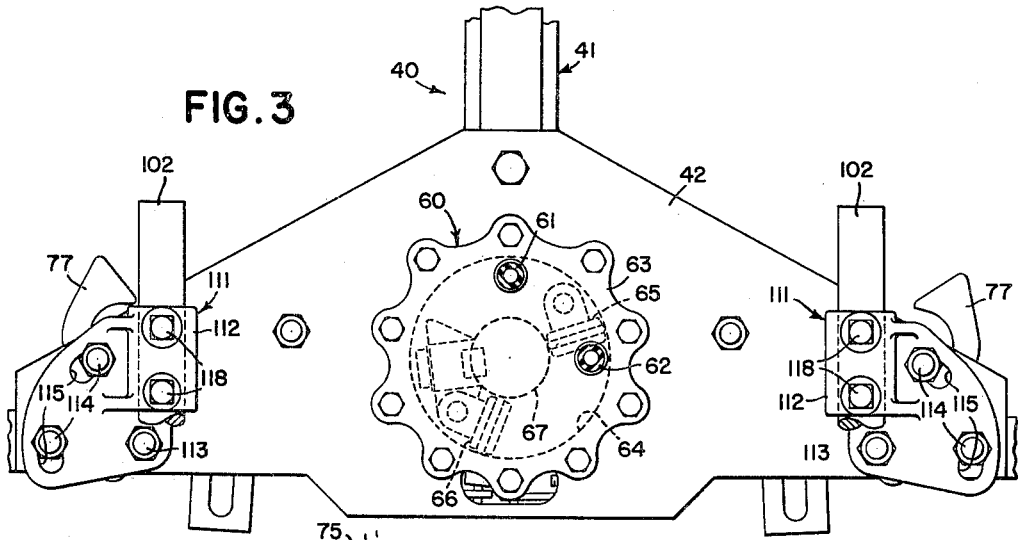
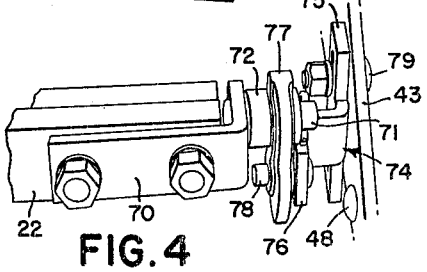
INVENTORS.
WALTER H. SILVER
BRUNO B. JOHANNSEN
BY
ATTORNEYS

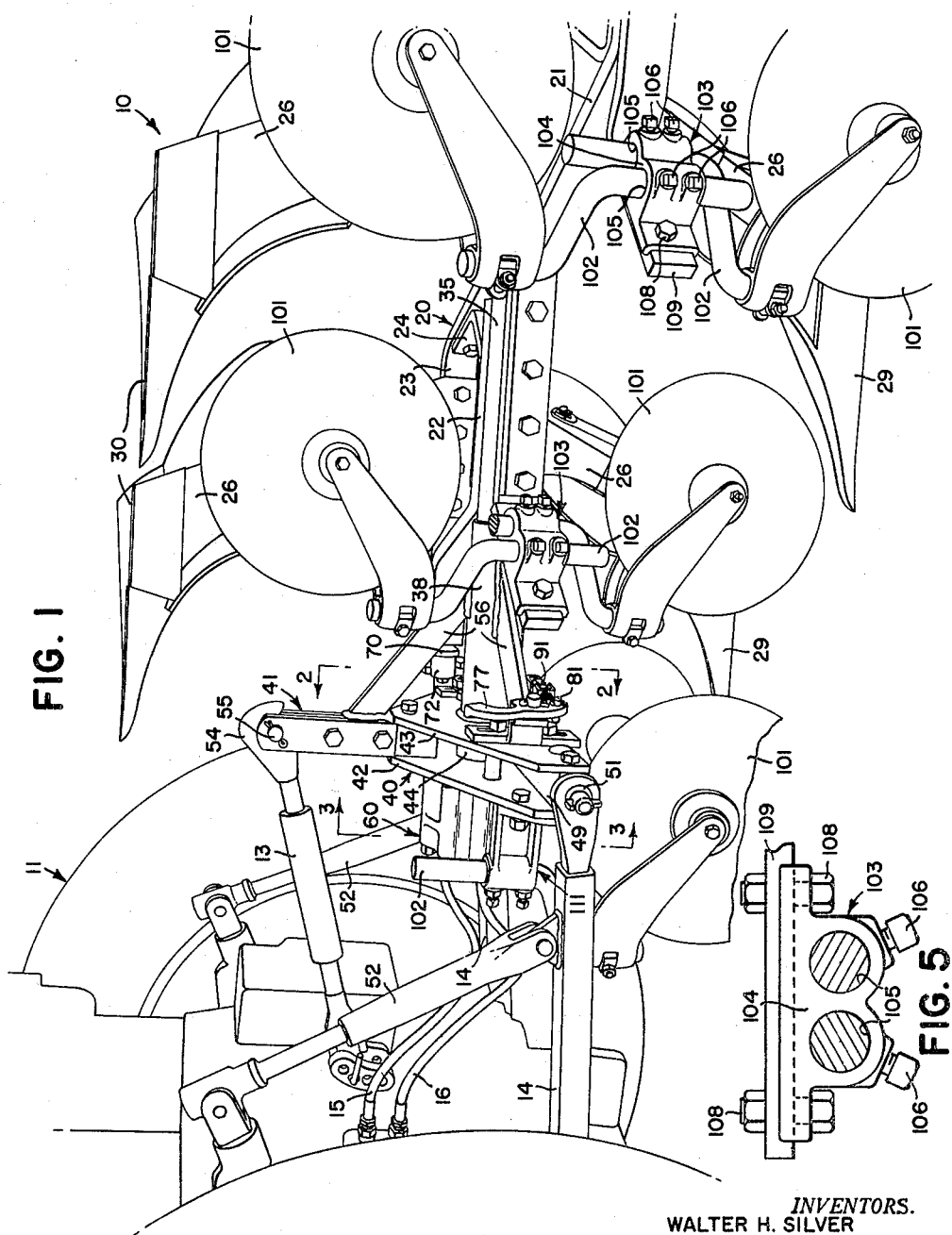

United States Patent Office 3,007,531
Patented Nov. 7, 1961

3,007,531
PLOW REVERSIBLE BY VANE TYPE HYDRAULIC MOTOR
Walter H. Silver and Bruno B. Johannsen, Moline, Ill., assignors, by mesne assignments, to Deere & Company, a corporation of Delaware
Filed July 17, 1958, Ser. No. 749,203
6 Claims. (Cl. 172—225)

The present invention relates generally to agricultural implements and more particularly to tractor propelled plows of the two-way or reversible type.

The object and general nature of this invention is the provision of a two-way plow having new and improved means for effecting a reversal of the plow from right hand plowing to left hand plowing, and vice versa, by means making use of the power of the tractor. Specifically, it is a feature of this invention to provide hydraulic reversal-effecting means of the type utilizing a simple hydraulic motor of the vane type. It is a particular feature of this invention to connect the vane of the hydraulic motor directly to the rockable or oscillatable beam of the reversible plow structure, the hydraulic motor being connected directly into the hydraulic power lift system of the tractor so that the plow may not only be raised and lowered by power direct from the tractor, but also automatically reversed, as desired.

Another important feature of the present invention is a provision of a two-way plow having power actuated means for indexing or reversing the plow furrow opener so as to change from right to left hand plowing, and vice versa, with automatically controlled latches so constructed and arranged as to hold the plow units in selected position but automatically releasable when power is directed to the reversing means. Specifically, the holding latches are operated by being responsive to the reaction of the reversing motor when the plow reversal is initiated.

Another feature of this invention is a provision of a new and improved front colter means for multibottom plows of the above mentioned type, particularly those that are adapted to be carried directly on the tractor.

These and other objects and advantages of the present invention will be apparent to those skilled in the art after a consideration of the following detailed description, taken in conjunction with the accompanying drawings, in which:

FIG. 1 is a perspective view of a two way mounted plow in which the principles of this invention have been incorporated.

FIG. 2 is an enlarged sectional view taken generally along the line 2—2 of FIG. 1.

FIG. 3 is an enlarged sectional view taken generally along the line 3—3 of FIG. 1.

FIG. 4 is a fragmentary perspective view of the locking roller mounting.

FIG. 5 is an enlarged detail view of the colter clamp.

Referring first to FIG. 1, for the purposes of illustrating the principles of the present invention we have chosen to show the same as embodied in a two-way plow 10 that is adapted to be connected to a farm tractor 11 having a power lift system of the hydraulic type that includes, first, power actuated means to raise and lower the upper and lower hitch links 13 and 14 of the 3-point hitch linkage with which the tractor 11 is equipped, and second, the tractor power lift means includes an independently controlled remote cylinder-actuating means to which a pair of hydraulic conduits 15 and 16 are connected. The tractor itself, as well as the hydraulic power lift system as just described, is conventional so far as the principles of the present invention are concerned and therefore has not been illustrated in full detail.

The two-way plow 10 is shown as a three-bottom moldboard plow that includes a plow frame 20 that is made up of a plurality of beams 21, 22 and 23 suitably interconnected by diagonal braces 24 and supporting three pairs of plow standards 26 to which moldboards or plow bottoms 29 and 30 are connected. The plow bottoms 29 are right hand plow bottoms and in operation throw the furrow slice to the right. The other plow bottoms 30 are left hand plow bottoms and throw the furrow slice to the left. The standards 26 are in pairs, as shown, and the standards of each pair lie generally in the same plane, one of the standards supporting a right hand plow bottom and the companion standard supporting a left hand plow bottom. Thus, when the frame 20 is rotated or oscillated through 180°, the plow is changed from right hand plowing to left hand plowing or vice versa.

The plow frame is rigidly fixed to a center fore-and-aft extending beam member 35 to which the plow standards and associated bracing are rigidly secured. The beam member 35 extends forwardly of the plow beams and includes a forward cylindrical section that is mounted for rocking within a sleeve member 38 that forms a part of a hitch frame that is indicated in its entirety by the reference numeral 40. The hitch frame 40 includes a vertical mast section 41 and a pair of front and rear index plates 42 and 43 rigidly connected together in fore-and-aft spaced apart relation. The plates 42 and 43 are apertured to receive the forwardly extending portion of the rockable beam 35. A draft collar 44 is disposed about and fixed rigidly to the forward end portion of the rockable beam 35 and is disposed between the plates 42 and 43. The collar is secured, as by a pin or the like, to the beam 35 and forms a draft transmitting connection between the rockable beam 35 and the hitch frame 40. The right and left hand lower portions of the index plates 42 and 43 are apertured to receive pairs of bolts 48 by which transverse draft bar sections 49 are fixed to and become a part of the hitch frame 20. The outer end of each draft bar section 49 is formed with a reduced end to receive the ball connector 51 carried at the rear end of the associated lower draft link 14. The forward end of each of the draft links 14 is connected for generally universal movement with the tractor and each draft link 14 carries an apertured lug to receive the lower end of an associated lift link 52 by virtue of which the links 14 may be raised and lowered, as in conventional practice. The upper hitch link 13 of the tractor 11 is provided with a hook end 54 that is adapted to be releasably engaged with a connector 55 carried at the upper end of the mase section 41. The sleeve 38 is reenforced by generally vertical and horizontal braces 56 that extend from the generally central portion of the sleeve forwardly, laterally and upwardly to points of connection with the rear index plate 43 and with the lower portion of the mast section 41.

As explained above, the power lift mechanism of the tractor is utilized for turning the plow frame from a right hand plowing position to a left hand plowing position, and vice versa, and to this end a hydraulic motor 60 is mounted on the hitch frame 40 generally centrally of and in front of the forward index plate 42. The hydraulic motor includes connections 61 and 62 (FIG. 3) that lead to the tractor power lift connections 15 and 16 (FIG. 1). The hydraulic unit 60 is of the vane type and comprises a housing 63 in which an annular chamber 64 (FIG. 3) is formed. The chamber 64 is formed in two sections by means of a stationary wall 65 and a movable wall or vane 66 that is secured to a rockable member in the form of a shaft section 67. Preferably, according to this invention, the shaft section 67 is formed by the forward end portion of the rockable shaft 35, but if desired, the shaft section 67 may be made separate and rigidly secured to the rockable shaft 35. The hydraulic connections 61 and 62 are arranged to communicate, respectively, with the two sections of the hydraulic motor chamber 64.

The hydraulic system of the tractor includes valve means to direct fluid under pressure through either of the connections 15 and 16, the other connection serving as a return line to the hydraulic system. Thus, by suitable operation of the valve means of the tractor hydraulic system the vane 66 may be swung through 180° as desired, such motion acting through the rockable shaft 35 to swing the plow frame 20 between right and left hand plowing positions. It will be understood, of course, that this reversal is not made unless the hitch links 13 and 14 have been raised to lift the plow into a transport position.

Stop means is provided for determining the end positions of the reversible plow frame, and such means will now be described.

A bracket 70 (FIG. 4) is fixed to the forwardmost portion of the plow frame 20 and includes a laterally inturned portion carrying a stud 71 on which a roller 72 is journaled. The bracket 70 reverses with the plow frame whenever the hydraulic motor 60 is actuated. Carried on the rear index plate 43 is a pair of stop members 73 and 74, these members being identical except that one is a right hand and the other a left hand part. Each of the stop members includes a vertical slotted section 75, and an associated leveling stop abutment 76 on which a latch member 77 is pivoted, as at 78. Each stop member is fixed to the front plate 42 by bolt and slot means 79 and accommodates a vertical adjustment of each stop means relative to the associated hitch frame. By loosening the bolts 79 the associated stop, together with the latch 77, may be adjusted so as to bring the plow frame, when in contact with the associated stop abutment 76, to exactly the position desired, depending upon the depth of plowing and other factors. Each latch member 77 is dimensioned so as to snugly engage over the roller 72 for locking the latter to the associated stop abutment, thus holding the plow in operating position without having to rely upon the maintenance of hydraulic pressure in the motor 60.

According to this invention means is provided for automatically operating the latches 77 in response to actuation of the tractor hydraulic means to reverse the plow from right hand plowing to left hand plowing and vice versa. Each latch 77 includes an apertured lower portion into which the forwardly turned end 81 of a transversely disposed latch rod 82 is disposed. The laterally inner end of each of the latch rods 82 extends slidably into the bifurcated swivel member 83, and a stop pin 84 is carried by the inner end portion of each latch rod 82 so as to engage the inner end of the associated swivel 83. A spring 87 is disposed about the rod 82 and lies between the associated swivel member 83 and an abutment washer 88 fixed by a pin 89 in position on the latch rod 82.

Both of the swivel members 83 are pivoted to an actuating lug 91 that is carried by the housing 63 and extends rearwardly therefrom through transversely slotted sections 92 of the plates 42 and 43. The housing 63 is capable of rocking on the associated shaft section 67 and the engagement of the lug 91 with one end or the other of the slots 92 serves to limit the permissive oscillation of the housing 63. The latch rods 82 are so dimensioned, and the associated parts are so constructed and arranged, that when fluid under pressure is first directed to the hydraulic motor 60, the reaction of the fluid pressure applied against the housing 63 will act through the associated lug 91 to shift one of the latches 77 out of engagement with the roller 72. After this action takes place, the hydraulic pressure exerted against the hydraulic motor vane 66 then acts directly against the rockable shaft 35 to reverse the plow frame, swinging the latter until the roller 72 is carried through 180° and comes into contact with the stop means 76 at the other side of the hitch frame. As soon as the roller comes snugly into engagement with the stop 76, the latch 77 associated therewith, acting under the force exerted by the associated spring 87, will snap over the roller and lock the plow in its new position. The parts are so constructed that the latches are retained in locking position even though the hydraulic connections 61 and 62 be returned to zero pressure.

In a two-way plow of the integral or tractor-carried type, the implement is usually disposed as close as possible to the rear end of the tractor in order to reduce the force required to lift the implement into a transport position. In a three-bottom plow, such as is shown in FIG. 1, there is ample space for mounting rolling colters 101 in front of each of the two rear bottoms. Preferably, each rolling colter 101 is connected to the associated plow beam through a colter shank 102 and associated clamping means 103 to the plow beam an appreciable distance ahead of the plow beam standards. The clamping means 103 (FIG. 5), according to this invention, comprises a dual clamping block 104 having separate sockets 105 and separate set screws 106 for fastening the colter shanks 102 individually in place, whereby loosening the attachment for one colter does not loosen the connection of the other colter. Each clamping block 104 is bolted, as at 108, to an associated coulter bracket 109.

While there ordinarily is ample clearance for the rear coulter clamps 103, where the plow is close coupled there is not sufficient space in front of the forwardmost plow bottoms to utilize a coulter mounting as described above for the forwardmost coulters. According to the present invention, instead of having the coulters for the forwardmost bottoms reverse with the plow frame, as in the case of the coulter for the pairs of rear bottoms, we mount two coulters in side by side relation in front of and carry them substantially on the front transverse index or hitch plate frame 42. As best shown in FIG. 3, each forwardmost coulter shank 102 is adjustably fixed to the front hitch frame plate 42 by means of a bracket structure 111 that preferably is in the form of or includes a sleeve section 112 in which the shank 102 of the associated coulter 101 is disposed for vertical adjustment. The casting or bracket member 111 is connected to the plate 42 by a pivot bolt 113 and by associated bolts 114 that extend through slots 115 in the bracket 11. By virtue of the bolt and slot means just described, each front coulter bracket 111 may be adjusted angularly as desired and then fixed in position. As will be observed from FIGS. 1 and 3, each of the front coulters 101 is disposed laterally of the center line of the plow, which corresponds generally to the center line of the rockable beam 35, a distance such that one or the other of the coulters is disposed substantially in the proper position directly ahead of the forwardmost plow bottom in operating position. In the arrangement shown, it is not necessary to reverse the front coulters when reversing the plow. Instead, the coulters may be fixed, as by set screw means 118, to penetrate the desired distance. Since the tractor is operated in a tilted position, with one rear wheel operating in the previously formed furrow while the other rear wheel runs on the land, the coulter that is in front of the plow bottom in plowing position will operate at the desired depth, while the other coulter, due to the aforesaid lateral tilting of the tractor, will merely skim the ground with only minimum penetration, or, depending upon the depth adjustment, may even pass over the ground entirely out of contact therewith.

While we have shown and described the preferred structure in which the principles of the present invention have been incorporated, it is to be understood that our invention is not to be limited to the particular means, shown and described above, but that, in fact, widely different means may be employed in the practice of the broader aspects of our invention.

What we claim, therefore, and desire to secure by Letters Patent is:

1. A two way plow comprising a generally transverse hitch frame, a generally fore-and-aft extending reversible plow beam rockably mounted in the generally central portion of said frame and extending forwardly therein, a hydraulic motor carried by said frame and including a rotor fixed to the forward end of said plow beam and a reaction-receiving part, the latter being rockable relative to said frame about the axis of said beam, means connecting the rotor to said rockable beam so as to rock with the latter, releasable latch means connecting the rockable beam and said frame, and a connection between said hydraulic motor part and said latch means whereby the latter is released by movement of said part.

2. A two way plow comprising a generally transverse hitch frame, a generally fore-and-aft extending reversible plow beam rockably mounted in said frame and extending forwardly of the latter, a hydraulic motor carried by said frame and including a vane fixed to the forward end of said beam and a housing enclosing said vane and rockably supported on said frame through the forward end of said beam, releasable latch means connecting the rockable beam and said frame, and a connection between said housing and said latch means whereby the latter is released by movement of said housing.

3. A two way plow comprising a generally transverse hitch frame, a generally fore-and-aft extending reversible plow beam rockably mounted in said frame, a hydraulic motor of the vane type carried by said frame and including a housing having hydraulic fluid pressure and discharge conduits and a pressure actuated vane oscillatable in said housing, means rockably mounting said housing on said frame, means fixedly connecting said vane to said reversible plow beam so as to shift the latter by hydraulic pressure exerted against said vane, releasable latch means connecting the rockable beam and said frame, and a connection between said housing and said latch means whereby the latter is released by movement of said housing.

4. A two way plow comprising a generally transverse hitch frame, a generally fore-and-aft extending reversible plow beam rockably mounted in said frame, a hydraulic motor of the vane type carried by said frame and including a housing having hydraulic fluid pressure and discharge conduits and a pressure actuated vane oscillatable in said housing, means rockably mounting said housing on said frame at the forward side thereof, means fixedly connecting said vane to said reversible plow beam so as to shift the latter by hydraulic pressure exerted against said vane, releasable latch means connecting the rockable beam and said frame at the rear side thereof, said frame having an opening extending from front to rear thereof, a part carried by the rockable housing and extending rearwardly through said opening, and a connection from said housing part and said latch means whereby the latter is released by movement of said housing.

5. A two way plow comprising a generally transverse hitch frame, a generally fore-and-aft extending reversible plow beam rockably mounted in said frame, a stop extension on said reversible plow beam, a pair of stop members adapted to receive said stop extension, means adjustably fixing said stop members to said transverse hitch frame, a frame holding latch mounted on each of said adjustable stop members and adapted to lock said beam-carried stop extension in selected position, said latches being movable with said adjustable stop members, and means to control said latches in any position of said stop members.

6. A two way plow comprising a generally transverse hitch frame, a generally fore-and-aft extending reversible plow beam rockably mounted in the generally central portion of said frame and extending forwardly therein, a hydraulic motor carried by said frame and including a rotor and a reaction-receiving part, means operatively connecting the rotor with the forward portion of said plow beam, said reaction-receiving part being shiftable relative to said frame, releasable latch means connecting the rockable beam and said frame, and a connection between said hydraulic motor part and said latch means whereby the latter is released by movement of said part.

References Cited in the file of this patent

UNITED STATES PATENTS

| 2,666,376 | Pursche | Jan. 19, 1954 |
| 2,698,563 | Edwards | Jan. 4, 1955 |
| 2,714,345 | Wilkerson | Aug. 2, 1955 |
| 2,900,032 | Mellen | Aug. 18, 1959 |
| 2,959,232 | Gordon | Nov. 8, 1960 |

FOREIGN PATENTS

| 548,674 | Belgium | June 30, 1956 |
| 1,130,163 | France | Sept. 17, 1956 |

OTHER REFERENCES

Publication: Kärntner, German application Serial No. K24451, printed April 5, 1956.